June 20, 1961 F. H. NICOLL 2,989,641

STORAGE LIGHT AMPLIFIER

Filed Oct. 30, 1957

INVENTOR.
FREDERICK H. NICOLL
BY
[signature]
ATTORNEY

United States Patent Office 2,989,641
Patented June 20, 1961

2,989,641
STORAGE LIGHT AMPLIFIER

Frederick H. Nicoll, Princeton, N.J., assignor to Radio Corporation of America, a corporation of Delaware
Filed Oct. 30, 1957, Serial No. 693,421
5 Claims. (Cl. 250—213)

This invention relates to light amplifier devices, and more particularly to storage type light amplifier devices and circuits.

One form of a light amplifier device may use a photoconductive material, that is, a material that has a conductivity that varies with radiation incident on the material, in combination with an electroluminescent material, that is, material that emits light when subjected to an electric field. The photoconductive and electroluminescent materials are electrically connected with a source of operating voltage in such a manner that the conductivity of the photoconductive material controls the electric field across the electroluminescent material. This construction may be accomplished by connecting a photoconductive material and an electroluminescent material in series with a source of alternating voltage. With no light incident on the photoconductive material (i.e. photoconductor) its conductivity is low and most of the alternating voltage is developed across the photoconductor so that the electric field across the electroluminescent material is too small to cause it to emit light. However, if light radiation of sufficient magnitude is made incident on the photoconductor its conductivity increases and a larger electric field will be developed across the electroluminescent material causing it to emit light.

If the photoconductor is shielded from the light emitted by the electroluminescent material, such as by an opaque material or by being insensitive to the wave length of the light emitted by the electroluminescent mataerial, the device will act as a simple light amplifier, that is, when incident radiation on the photoconductor is removed the electroluminescent material will cease to emit light. However, if the photoconductor is not optically shielded from the electroluminescent material, the light emitted from the electroluminescent material may reach the photoconductor and maintain its conductivity high, even after the light originally exciting the photoconductor is removed. This action maintains a relatively high electric field across the electroluminescent material and it continues to emit light. Storage of the light information that was incident on the photoconductor is thus effected by a regenerative action caused by the optical feedback between the electroluminescent material and the photoconductor. It has been found that the conductivity, and thus the current carrying capacity of certain photoconductive materials exhibits hysteretic effects. This is a bistable effect that may be used to operate a storage light amplifier without the use of regenerative optical feedback.

It is therefore an object of this invention to provide an improved storage light amplifier utilizing photoconductive and electroluminescent elements without the use of optical feedback.

It is another object of this invention to provide an improved storage light amplifier having photoconductive and electroluminescent elements utilizing the hysteretic effects of the photoconductor material.

It is a further object of this invention to provide an improved storage light amplifier of photoconductive and electroluminescent materials electrically connected in series, in which the hysteretics effect of the photoconductive material is used to eliminate the use of optical feedback.

In accordance with the invention, it has been discovered that certain photoconductive materials exhibit a hysteretic effect in their conductivity, and hence current therethrough, when an electric field of a high value is applied to the photoconductor. That is, two different stable values of conductivity and current through the photoconductor may exist for a given electric field across the photoconductor. A photoconductive material of this type is combined with an electroluminescent material in a light amplifier device and an electric field of a sufficiently high value is applied to the device so that the photoconductor may be triggered from one state of conductivity to a second state of conductivity by the action of light on the photoconductor.

The invention will be better understood, however, when the following description is read with reference to the accompanying drawing, in which.

Figures 1, 2, 3, 4, 5:
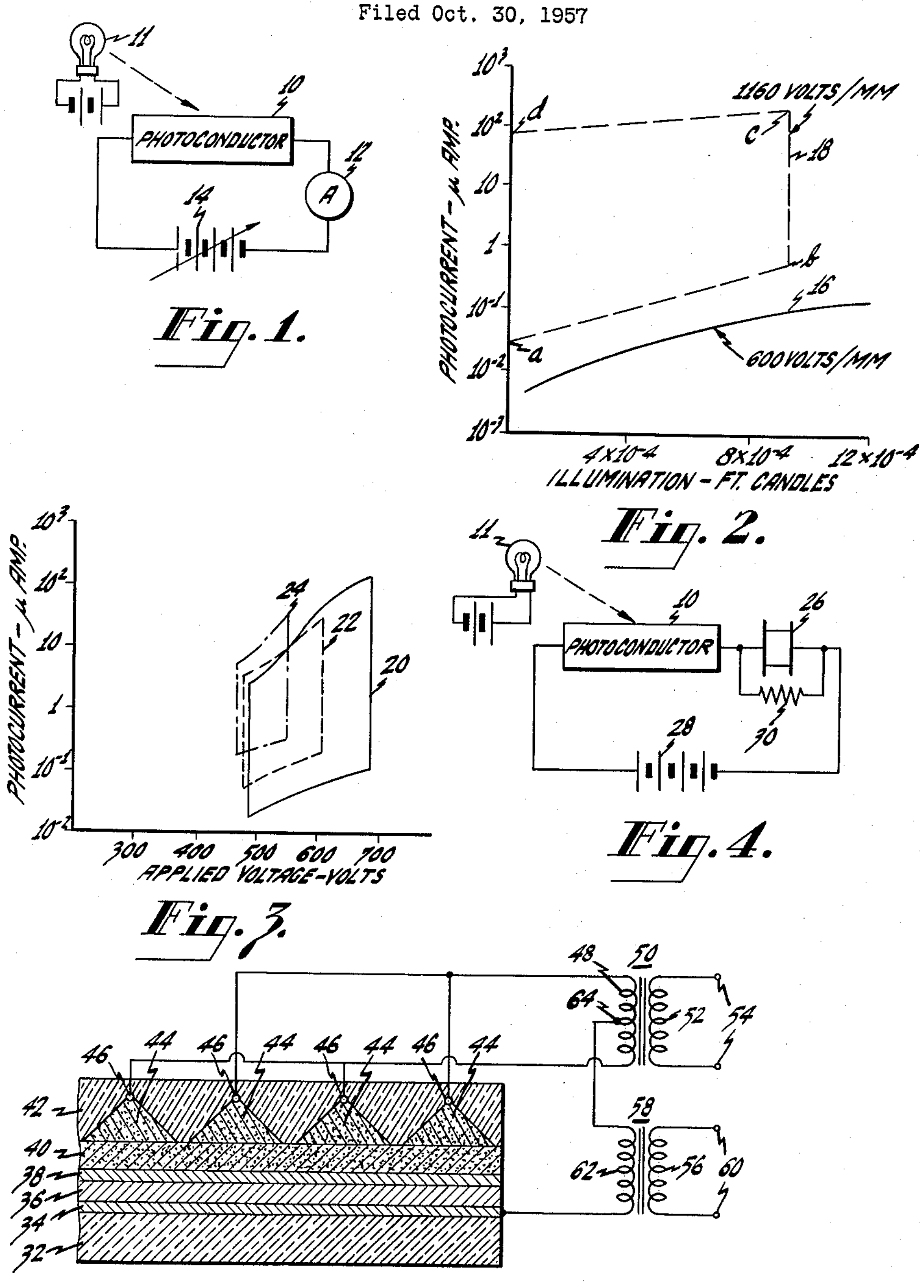
FIGURE 1 is a schematic circuit diagram of a photoconductor circuit for illustrating the hysteretic effect of the photoconductor.
FIGURES 2 and 3 are graphs showing curves illustrating the hysteretic effect of the photoconductor that may be obtained with the circuit of FIGURE 1.
FIGURE 4 is a schematic circuit diagram of an elemental area of a storage light amplifier as one embodiment of the invention.
FIGURE 5 is a schematic circuit diagram of a storage light amplifier as another embodiment of the invention.

Referring now to the drawing, and in particular to FIGURES 1, 2, and 3, a photoconductor circuit includes a photoconductor or body of photoconductive material 10 and an ammeter 12 connected in series across a source of direct voltage, here illustrated as a battery 14, which may be varied. Provision is made to illuminate the photoconductor 10 with radiant energy such as by an incandescent lamp 11. For convenient study, the photoconductor 10 is supported in a gap between a pair of electrodes, and an electric field, supplied by the battery 14, is provided across the photoconductor 10. The value of the electric field provided by the battery 14 across the gap is expressed in volts per millimeter. The photoconductive material may be cadmium selenide in a one percent ethylcellulose binder and is supported in a .5 millimeter gap.

The curves of FIGURE 2 are a plot of the current through the photoconductor 10 as the illumination is varied with the electric field being held constant; and the curves of FIGURE 3 are a plot of the current through the photoconductor 10 as the electric field is varied with the illumination being held constant.

The curve 16 of FIGURE 2 shows the rise of the current through the photoconductor as the illumination is increased with an electric field across the photoconductor 10 of 600 volts per millimeter. It will be noted that the current continues to rise with an increase in illumination. However, when the electric field is raised to 1160 volts per millimeter the curve 18 is obtained. As illumination is applied to the photoconductor 10 the current begins to rise from its initial value indicated by point *a* on the curve in the normal fashion until point *b* on curve 18 is reached, at which point the current suddenly increases on the order of three magnitudes to point *c*. If now the illumination is removed the current falls slightly to point *d* but still remains on the order of three magnitudes larger than the original current before the illumination was applied to the photoconductor. The light that was incident on the photoconductor 10 thus produces a storage effect in the current. Removal of the voltage will return the current to its initial value as indicated by point *a*.

It has been observed that the current through the photoconductor 10 which has gone through the storage cycle and is at a high value after the removal of the light, is not a steady current, but fluctuates randomly about an average value, such as the value *d* indicated on curve 18. This current may be thought of as a direct current of the value indicated by point *d* on which is superimposed an alternating current. For some applications this alternating component of the current is important and will be more specifically referred to in the discussion of FIGURE 4.

A hysteretic effect may also be observed with respect to a plot of the photoconductor current against the voltage applied to the gap, as shown in FIGURE 3. Three curves are shown on the plot, the solid line curve 20 is with no illumination on the photoconductor 10, the dashed line curve 22 is with an illumination of 0.0003 foot candles of light on the photoconductor 10, and the broken line curve 24 is with 0.0006 foot candles of light on the photoconductor 10. It will be noted that with no illumination the current rises normally with voltage until approximately 700 volts are applied to the gap, at which point the current suddenly increases on the order of three magnitudes. If now the voltage is decreased, the current does not decrease in the same manner that it increased, but decreases slowly until a voltage of about 500 volts is reached, at which point the current suddenly decreases to a small value. With an illumination of 0.0003 foot candles on the photoconductor, the critical voltage, that is, the voltage at which the current suddenly increases, is at about 600 volts, as noted by curve 22. Curve 24 shows that the critical voltage is further reduced to approximately 550 volts by an increase of illumination to 0.0006 foot candles. The significant feature of the hysteretic curves shown in FIGURE 3 is that the critical voltage at which the photoconductor current suddenly increases may be controlled by the light incident on the photoconductor 10.

While the hysteretic effect of photoconductive materials has been described with respect to cadmium selenide, other photoconductive materials exhibit like hysteretic effects, such as cadmium sulfide and zinc oxide. The time required for the hysteretic actions of these various materials may differ, however. For instance, the behavior of cadmium sulfide powder is similar to that of cadmium selenide but on an expanded time scale. Cadmium sulfide is responsive to high light excitation for about 24 hours after the light is removed, while cadmium selenide is responsive to such excitation only for seconds. In like manner, the storage effect, that is, the current flow in the presence of high electric fields, in cadmium selenide disappears when the voltage is interrupted in approximately one-tenth of a second, while the voltage must be interrupted for more than an hour when cadmium sulfide is used. The manner in which the materials are prepared also affects the exact configuration and values of the hysteretic effect. For instance, in comparing cadmium selenide prepared in powder form and in sintered layer form, the behavior is essentially similar, but storage occurs at somewhat lower voltages in the sintered layer form.

Referring now to FIGURE 4, a storage light amplifier circuit includes a photoconductor element 10, which may be cadmium selenide, in series with an electroluminescent cell 26 and a source of direct voltage, here illustrated as a battery 28. The electroluminescent cell 26 is shunted by a resistor 30. The electroluminescent cell 26 may comprise an electroluminescent phosphor, such as zinc sulfide, activated with copper and mixed with a suitable plastic, such as ethyl cellulose. A changing or alternating voltage thereacross is required for light emission.

Assume now that no light is incident on the photoconductor 10. A direct current will flow from the battery 28 through the photoconductor 10 and the resistor 30. No current will flow through the electroluminescent cell 26 since an alternating voltage is required for its operation. If the voltage of the battery is sufficiently high, as explained with reference to FIGURES 1, 2, and 3, a small amount of light on the photoconductor, will cause the photoconductor current to rise in a hysteretic manner to a high value. As previously mentioned, this current is not steady but fluctuates around an average direct value. These current fluctuations are sufficient to exceed the threshold value of voltage across the electroluminescent cell 26 to cause light emission.

Such a device will operate as a storage light amplifier because the operating voltage must be removed in order to reduce the current through the photoconductor to a low value. Removal of the light will not substantially reduce the current, as may be seen by the curve 18 of FIGURE 2. No optical feedback between the electroluminescent cell 26 and the photoconductor 10 is required to operate the device. To observe different images, the operating voltage is alternately applied and removed at a rate determined by the decay time of the device from the storage condition. If the insulating properties of the electroluminescent cell 26 are too high, it will fail to discharge between removal and reapplication of the operating voltage, and it may be necessary to decrease the resistance of the cell 26 by the mixture of a suitable material in the electroluminescent phosphor binder or by shunting the element 26 such as will be provided by the resistor 30.

The use of the direct voltage in combination with the electroluminescent cell 26, which is a capacitive element, insures that the current of the photoconductor 10 in the dark does not cause any light emission from the electroluminescent cell 26, since the cell 26 does not respond to a steady direct current; and a relatively high direct voltage may be used to increase the sensitivity of the device. The sensitivity is also further increased by the fact that the direct operating voltage may be made high enough so that a small amount of light on the photoconductor 10 will trigger the device to the full luminance of the electroluminescent cell 26.

Referring now to FIGURE 5, a storage light amplifier device includes a glass plate 32 upon which the other elements of the device are mounted. On one surface of the glass plate 32 is a layer of transparent conducting material 34, such as tin oxide. This may be made by heating the glass plate 32 and spraying tin chloride on the plate. The tin chloride reduces to tin oxide on the plate. A layer of electroluminescent material 36, which may be prepared in the manner previously described, is affixed to the tin chloride layer 34, and a layer of nonconducting opaque material 38, which may be carbon particles in an epoxy resin, is positioned over the electroluminescent layer 36. A layer of conductive cadmium sulfide 40 embedded in an epoxy resin overlies the opaque layer 36. The cadmium sulfide is not photoconductive, but is heat treated to be electrically conductive. A grooved plastic panel 42 is positioned over the conductive layer 40, with the grooved side facing the conductive cadmium sulfide layer 40. A cadmium selenide powder 44 is embedded in the grooves of the plastic layer 42, and is thus formed in strips having a triangular cross-section. Conducting lines 46 are located on ridges formed by the photoconductor strips 44. Alternate conducting lines 46 are connected to opposite ends of the secondary winding 48 of a transformer 50, and a first operating voltage is applied to the primary winding 52 of the transformer 50 through the terminals 54. A second operating voltage is applied to the primary winding 56 of a second transformer 58 through a second set of input terminals 60, and one end of a secondary winding 62 of the transformer 58 is connected to the transparent conducting layer 34 while the other end of the secondary 62 is connected to a center tap 64 of the secondary winding 48 of the first transformer 50.

In operation, the first operating voltage is applied through the transformer 50 across alternate conducting lines of the photoconductor material 44. This voltage is made sufficiently high that storage currents as described with reference to FIGURE 1 may occur in the photoconductive material 44 when it is excited briefly by light. These currents will flow between adjacent conducting lines 46 through the photoconductor strips 44 and through the conductive cadmium sulfide layer 40 even after an exciting light is removed and form or store the image light pattern in the photoconductor material 44. No light is emitted, however, from the electroluminescent layer 36, since no voltage yet exists between the electroluminescent layer 36 and the photoconductor strips 44. If the second operating voltage now is applied between the transparent conducting layer 34 and the center tap 64 of the first transformer 50 a current will flow through the electroluminescent layer 36 in accordance with the information stored in the photoconductive material 44 to reproduce the light image that was applied to the photoconductor 44. The current flow in the electroluminescent layer 36 will be relatively small if the second operating voltage is made smaller than the first operating voltage and no large light spots will be formed that result from excess operating voltages. The purpose of the cadmium sulfide conducting layer 40 is to physically spread the currents in the electroluminescent layer 36 and produce larger elemental areas of light output.

In a particular device constructed in accordance with the invention, the grooves in the plastic layer 42 containing the photoconductor 44 are approximately 15 mils deep on 25 mil centers. The first operating voltage was set at 600 volts R.M.S. at 60 cycles per second and the second operating voltage was set at 110 volts R.M.S. at 380 cycles per second. The frequencies of the operating voltages may be made the same, however, the electroluminescent material provides a brighter image at a higher frequency. Care should be exercised in selecting the two frequencies, if they are to be different, so that no beats occur that will cause visible fluctuations of the light and consequent degradation of the image.

The circuit may be also operated with the first operating voltage replaced by a center tapped direct voltage source. Alternating voltage operation of the photoconductor material 44 is not required while alternating voltage operation of the electroluminescent material 36 is required.

Erasure of the stored information is effected by removing the first operating voltage momentarily and then reapplying it. If the second operating voltage is removed, the image will disappear, however, the stored information in the photoconductor material 44 will remain, since the current through the photoconductor material 44 is not substantially affected by the second operating voltage. Reapplication of the second operating voltage will again render the stored information visible.

If the first operating voltage is made zero and the value of the second operating voltage increased, the device will operate as a normal light amplifier. Thus, it is possible for the device to be conditioned for normal light amplifier operation to observe a moving image, and if at any time it is desired to store the moving image, the voltages may be switched to increase the first operating voltage from zero to a high value and decrease the value of the second operating voltage. This action will store the information that was incident upon the device at the time of the changing of the voltages. It is, of course, necessary to remove the incident light from the device at the time of the voltage change.

A storage light amplifier device constructed in accordance with the invention is characterized by its high sensitivity and by its simplicity and versatility of operation.

I claim:

1. A storage light amplifier comprising in combination, an electroluminescent body for emitting light when subjected to an alternating electric field, a bistable photoconductive body having a conductivity characteristic with respect to radiation thereon when subjected to an electric field having at least a predetermined minimum intensity such that its conductivity is instantaneously increased from a stable low value to a stable high value when subjected to radiation, the current flow through said photoconductive body when in a state of high conductivity having an average direct current component and a randomly fluctuating current component, said bodies being optically shielded from each other, means for applying a direct operating voltage to said photoconductive and electroluminescent bodies to provide a direct electric field having at least a predetermined minimum intensity across said photoconductive body, and means for increasing the conductivity of said photoconductive body from said stable low value to said stable high value providing a varying electric field across said electroluminescent body corresponding to said randomly fluctuating current component to cause light emission from said electroluminescent body.

2. A storage light amplifier comprising in combination a layer of electroluminescent material for emitting light when subjected to an alternating electric field, a layer of conducting material having one surface affixed to one surface of said layer of electroluminescent material, a plurality of strips of bistable photoconductive material affixed to the other surface of said layer of conducting material, said strips of photoconductive material having a conductivity characteristic with respect to radiation thereon when subjected to an electric field having at least a predetermined minimum intensity such that their conductivity is instantaneously increased from a stable low value to a stable high value when subjected to radiation, an opaque insulating means interposed between said electroluminescent layer and said strips, means for applying a first alternating voltage to alternate strips of said photoconductive material to provide an electric field having at least a predetermined minimum intensity between adjacent strips of said photoconductive material, means for applying a second source of operating voltage between said strips of photoconductive material and said layer of electroluminescent material, and means for increasing the conductivity of said photoconductive material from a stable low value to a stable high value to cause conduction between adjacent strips of photoconductive material and an increase in the voltage applied across said layer of electroluminescent material and light emission therefrom.

3. A storage light amplifier comprising in combination a layer of electroluminescent material for emitting light when subjected to an alternating electric field, a light opaque layer having one surface overlying one surface of said electroluminescent layer, a layer of electrically conducting material having one surface affixed to the other surface of said light opaque layer, a plurality of strips of bistable photoconductive material affixed to the other side of said layer of conducting material, said strips of bistable photoconductive material having a conductivity characteristic with respect to radiation thereon when subjected to an electric field having at least a predetermined minimum intensity such that their conductivity is instantaneously increased from a stable low value to a stable high value when subjected to radiation, means for applying a first alternating voltage to said strips of photoconductive material including a transformer having two end taps and a center tap and having said end taps connected to alternate strips of photoconductive material to provide an electric field between adjacent strips of photoconductive material, means for applying a second source of operating voltage between said center tap and said layer of electroluminescent material, and means for increasing the conductivity of said photoconductive material from a stable low value to a stable high value to cause conduction between adjacent strips of photoconductive material to provide an increase in the voltage applied across said layer of electroluminescent material and light emission therefrom.

4. A storage light amplifier comprising, a bistable photoconductive body and an electroluminescent material in electrical connection and optically shielded from each other, said photoconductive body having a conductivity characteristic providing two stable states of lower and higher conductivity respectively, the normal state being the lower conductivity state, means for triggering said body from said lower conductivity stable state to said higher conductivity stable state by applying a voltage to said body of at least a predetermined minimum magnitude, and means for applying radiant energy to said photoconductive body while in said higher conductivity stable state thereby affording a substantial increase in the photoconductive current whereby said body stores radiant energy information.

5. A storage light amplifier comprising, a bistable photoconductive body and an electroluminescent material in electrical connection and optically shielded from each other, said photoconductive body having a conductivity characteristic providing two stable states of lower and higher conductivity respectively, the normal state being the lower conductivity state, and means for increasing said conductivity from said normal lower conductivity stable state to said higher conductivity stable state, said means effecting the application to said photoconductive body of an operating voltage of such magnitude that an electric field of a predetermined minimum intensity is provided across said photoconductive body and of radiant energy of a predetermined magnitude such that said photoconductive body is triggered into said higher conductivity stable state and stores information representative of said radiant energy.

References Cited in the file of this patent

UNITED STATES PATENTS

| | | |
|---|---|---|
| 2,768,310 | Kazan et al. | Oct. 23, 1956 |
| 2,818,511 | Ullery et al. | Dec. 31, 1957 |
| 2,837,661 | Orthuber et al. | June 3, 1958 |
| 2,839,690 | Kazan | June 17, 1958 |
| 2,875,350 | Orthuber et al. | Feb. 24, 1959 |

OTHER REFERENCES

Kazan: RCA TN. No. 28, pub. by RCA, RCA Laboratories, Princeton, N.J. (1 page).

Kazan et al.: Proceedings of the I.R.E., vol. 43, No. 12, December 1955 (pp. 1888–1897).

Kazan: Proceedings of the I.R.E., October 1957 (pp. 1358–1364).